United States Patent
Stenstrom et al.

(10) Patent No.: US 9,795,527 B2
(45) Date of Patent: Oct. 24, 2017

(54) BACKREST FIXATION SYSTEM AND AN ELECTRICALLY POWERED WHEELCHAIR COMPRISING THE SAME

(71) Applicant: PERMOBIL AB, Timra (SE)

(72) Inventors: Rune Stenstrom, Sundsvall (SE); Hans-Erik West, Sundsvall (SE)

(73) Assignee: PERMOBIL AB, Timra (SE)

( * ) Notice: Subject to any disclaimer, the term of this patent is extended or adjusted under 35 U.S.C. 154(b) by 0 days.

(21) Appl. No.: 15/121,486

(22) PCT Filed: Feb. 26, 2015

(86) PCT No.: PCT/EP2015/053994
§ 371 (c)(1),
(2) Date: Aug. 25, 2016

(87) PCT Pub. No.: WO2015/128406
PCT Pub. Date: Sep. 3, 2015

(65) Prior Publication Data
US 2016/0367418 A1    Dec. 22, 2016

(30) Foreign Application Priority Data
Feb. 27, 2014    (EP) .................................. 14157009

(51) Int. Cl.
*A47C 7/02*    (2006.01)
*A61G 5/12*    (2006.01)
(Continued)

(52) U.S. Cl.
CPC .................. *A61G 5/12* (2013.01); *A61G 5/04* (2013.01); *A61G 5/1067* (2013.01); *A61G 5/122* (2016.11); *B60N 2/22* (2013.01); *A61G 5/043* (2013.01)

(58) Field of Classification Search
CPC ........ A61G 5/1067; A61G 5/12; A61G 5/122; A61G 5/04; A61G 5/043; B60N 2/22
(Continued)

(56) References Cited

U.S. PATENT DOCUMENTS 2,678,085 A * 5/1954 De Minno ........... A47C 20/043
                                                   297/383
4,402,546 A * 9/1983 Johnson ................... B60N 2/22
                                                   297/440.16 X
(Continued)

FOREIGN PATENT DOCUMENTS

EP        2 213 270        8/2010
WO        2010/017183      2/2010

OTHER PUBLICATIONS

International Search Report corresponding to International Patent Application No. PCT/EP2015/053994, dated Mar. 1, 2015.

*Primary Examiner* — Rodney B White
(74) *Attorney, Agent, or Firm* — McAndrews, Held & Malloy, Ltd.

(57) ABSTRACT

A backrest fixation system (1) for a wheelchair, wherein the backrest fixation system (1) comprises a seat frame member (3) having a groove side (3*a*) provided with a first groove (5) having first groove retaining surfaces, which seat frame member (3) has a first lateral side (3*b*) and a second lateral side (3*c*) parallel to each other and which define lateral sides of the groove side (3*a*), a first groove insert member (9) arranged in the first groove (5) and retained in the first groove (5) by means of the first groove retaining surfaces, a backrest attachment member (15) having a first backrest attachment member through-opening (15*a*), a first fastener (17), and a reinforcement member (13) arranged between the backrest attachment member (15) and the groove side (3*a*) of the seat frame member (3), which reinforcement member (13) has a first leg (13*a*) and a second leg (13*b*), wherein the
(Continued)

first leg (13a) extends along the first lateral side (3b) of the seat frame member (3) and the second leg (13b) extends along the second lateral side (3c) of the seat frame member (3), wherein the first groove insert member (9) is provided with a first groove insert member through-opening (9a) and the reinforcement member (13) is provided with a first reinforcement member through-opening (13d), and wherein the first fastener (17) extends through the first backrest attachment member through-opening (15a), the first reinforcement member through-opening (13d), and the first groove insert member through-opening (9a). An electrically powered wheelchair comprising a backrest fixation system is also presented herein.

14 Claims, 3 Drawing Sheets

(51) Int. Cl.
*A61G 5/10* (2006.01)
*B60N 2/22* (2006.01)
*A61G 5/04* (2013.01)

(58) Field of Classification Search
USPC .......... 297/350, 383, 440.1, 440.14, 440.15, 297/440.16, 440.24, DIG. 4
See application file for complete search history.

(56) References Cited

U.S. PATENT DOCUMENTS

| | | | | |
|---|---|---|---|---|
| 5,209,509 | A * | 5/1993 | Gay | A61G 5/12 297/DIG. 4X |
| 5,564,786 | A * | 10/1996 | Peek | A61G 5/10 297/DIG. 4X |
| 5,795,024 | A * | 8/1998 | Collins | B60N 2/23 297/452.18 X |
| 6,352,307 | B1 * | 3/2002 | Engman | A61G 5/1059 297/DIG. 4X |
| 6,543,855 | B2 * | 4/2003 | Bruck | B60N 2/682 297/440.16 |
| 6,685,272 | B1 * | 2/2004 | Bonk | B60N 2/23 297/452.18 X |
| 6,767,040 | B1 * | 7/2004 | Freijy | B60N 2/3031 297/383 X |
| 6,913,318 | B2 * | 7/2005 | Higley | A61G 5/1067 297/383 |
| 7,959,232 | B2 * | 6/2011 | Sawada | B60N 2/682 297/440.15 X |
| 2001/0006302 | A1 * | 7/2001 | Nagayasu | B60N 2/682 297/440.15 |
| 2005/0236813 | A1 | 10/2005 | Cerreto et al. | |
| 2012/0112507 | A1 | 5/2012 | Cerreto | |

* cited by examiner

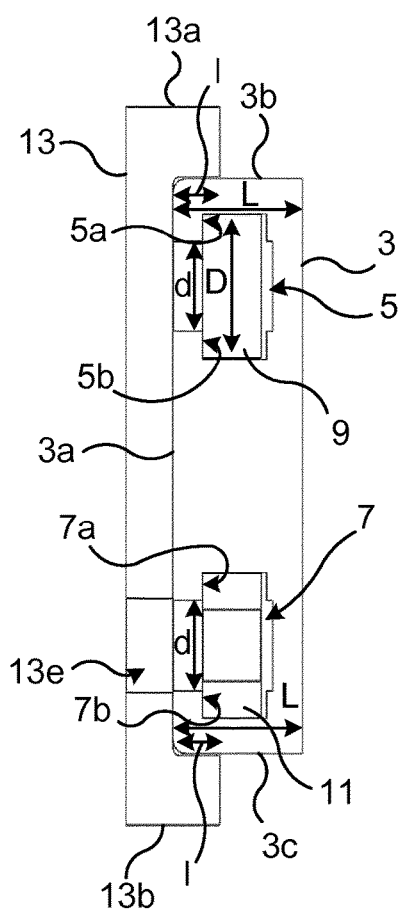
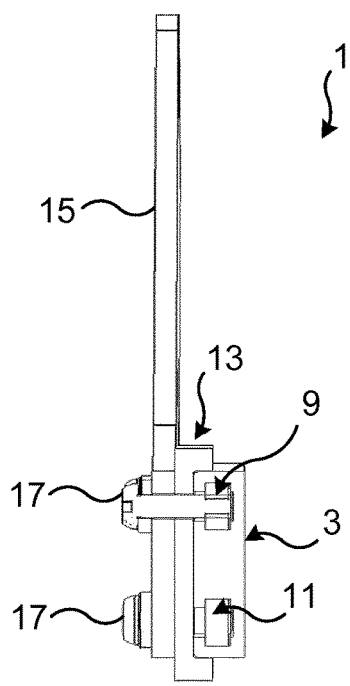
Fig. 3a
Fig. 3b

BACKREST FIXATION SYSTEM AND AN ELECTRICALLY POWERED WHEELCHAIR COMPRISING THE SAME

CROSS-REFERENCE TO RELATED APPLICATIONS/INCORPORATION BY REFERENCE

The present application is the U.S. national phase under §371 of International Application No. PCT/EP2015/053994, having an international filing date of Feb. 26, 2015, which claims priority to EP Patent Application Nos. 14157009.3, filed Feb. 27, 2014. The entire contents of the above-mentioned prior-filed applications are hereby expressly incorporated herein by reference.

TECHNICAL FIELD

The present disclosure generally relates to wheelchairs. In particular it relates to a backrest fixation system for mounting a backrest to a wheelchair and to an electrically powered wheelchair comprising such a backrest fixation system.

BACKGROUND

Electrically powered wheelchairs have a chassis to which a seating system is mounted. The seating system may comprise a seat frame to which the seat cushion is mounted, and a backrest frame mounted to the seat frame by means of a backrest fixation system. A backrest is mounted to the backrest frame. The backrest frame may for example comprise two vertical members which are attached to the seat frame, and to which the backrest is mounted.

Today, there are electrically powered wheelchairs on the market which have a seat frame arrangement that has one or more grooves along each lateral side, i.e. the wheel sides of the electrically powered wheelchair. These grooves may for example be used to attach various devices to the electrically powered wheelchair in a convenient manner. The grooves are sometimes also utilised for attaching the backrest fixation system by means of fasteners such as screws.

The assembly of such seat frame arrangements are rather difficult, because screw heads are inserted in the groove at the end face of the seat frame arrangement, where the groove opens. The screws then have to be assembled with the backrest frame, which is cumbersome.

When a wheelchair such as an electrically powered wheelchair is to be moved a greater distance it may be transported in a motor vehicle such as a bus or a car. The wheelchair occupant may occupy the wheelchair seat during such transport. In case of a large deceleration force, for example in the event of a crash, the force propagates to the backrest frame through the backrest fixation system. If the magnitude of the force reaches a threshold, shear stress acting on the fasteners may result in that the fasteners break, and/or in that the seat frame arrangement is damaged.

SUMMARY

In view of the above, a general object of the present disclosure is to provide a backrest fixation system and an electrically powered wheelchair which solves or at least mitigates the problems of the prior art.

Hence, according to a first aspect of the present disclosure there is provided a backrest fixation system for a wheelchair, wherein the backrest fixation system comprises: a seat frame member having a groove side provided with a first groove having first groove retaining surfaces, which seat frame member has a first lateral side and a second lateral side parallel to each other and which define lateral sides of the groove side, a first groove insert member arranged in the first groove and retained in the first groove by means of the first groove retaining surfaces, a backrest attachment member having a first backrest attachment member through-opening, a first fastener, and a reinforcement member arranged between the backrest attachment member and the groove side of the seat frame member, which reinforcement member has a first leg and a second leg, wherein the first leg extends along the first lateral side of the seat frame member and the second leg extends along the second lateral side of the seat frame member, wherein the first groove insert member is provided with a first groove insert member through-opening and the reinforcement member is provided with a first reinforcement member through-opening, and wherein the first fastener extends through the first backrest attachment member through-opening, the first reinforcement member through-opening, and the first groove insert member through-opening.

By means of the combination of the reinforcement member which embraces the seat frame member by means of the first leg and the second leg, and the first groove insert member arranged in the first groove, the backrest fixation system, and in particular the first fastener, is able to handle larger shearing forces. An effect which obtainable by means of this design is hence that the backrest fixation system is able to withstand higher forces than previous designs utilising a seat frame arrangement having grooves, resulting in a more robust wheelchair.

According to one embodiment the first groove has a groove mouth which is narrower than a corresponding dimension of the first groove insert member.

According to one embodiment the first leg has an overlap with the first lateral side corresponding to at least 20% of the thickness of the seat frame member.

According to one embodiment the second leg has an overlap with the second lateral side corresponding to at least 20% of the thickness of the seat frame member.

According to one embodiment each of the first leg and the second leg extend along a respective entire side of the reinforcement member.

According to one embodiment the groove side has a second groove parallel to the first groove, which second groove has second groove retaining surfaces, wherein the backrest fixation system further comprises a second groove insert member arranged in the second groove and retained in the second groove by means of the second groove retaining surfaces, and a second fastener, wherein the second groove insert member is provided with a second groove insert member through-opening, the reinforcement member is provided with a second reinforcement member through-opening, and the backrest attachment member has a second backrest attachment member through-opening, and wherein the second fastener extends through the second backrest attachment member through-opening, the second reinforcement member through-opening, and the second groove insert member through-opening.

By means of an additional groove, i.e. the second groove, and the second groove insert member, any forces, such as shearing forces, applied to the first fastener may be distributed to the second fastener. The mechanical strength of the backrest fixation system may thus be increased.

According to one embodiment the second groove has a groove mouth which is narrower than a corresponding dimension of the second groove insert member.

According to one embodiment the first groove insert member and the second groove insert member are structurally identical. Production may thereby be simplified and made more cost efficient, since a single design may be utilised for both groove insert members.

According to one embodiment the backrest fixation system is made of metal.

According to one embodiment the reinforcement member embraces the seat frame member by means of the first leg and the second leg.

According to one embodiment the first groove opens at one end of the groove side. It is thereby possible to insert the first groove insert member from the side into the first groove and to further slide it into position in the first groove.

According to one embodiment the second groove opens at one end of the groove side. It is thereby possible to insert the second groove insert member from the side into the second groove and to further slide it into position in the second groove.

According to one embodiment the reinforcement member has a central portion, wherein the first leg extends from one end of the central portion and the second leg extends from another end of the central portion.

According to a second aspect of the present disclosure there is provided an electrically powered wheelchair comprising a backrest arrangement having two frame members, and two backrest fixation systems according to the first aspect presented herein, wherein each backrest fixation system fixates a respective frame member.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIG. 3a is a cross-sectional view of a reinforcement member arranged with a seat frame member;

FIG. 3b is a cross-sectional view of the backrest fixation system in FIG. 1.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
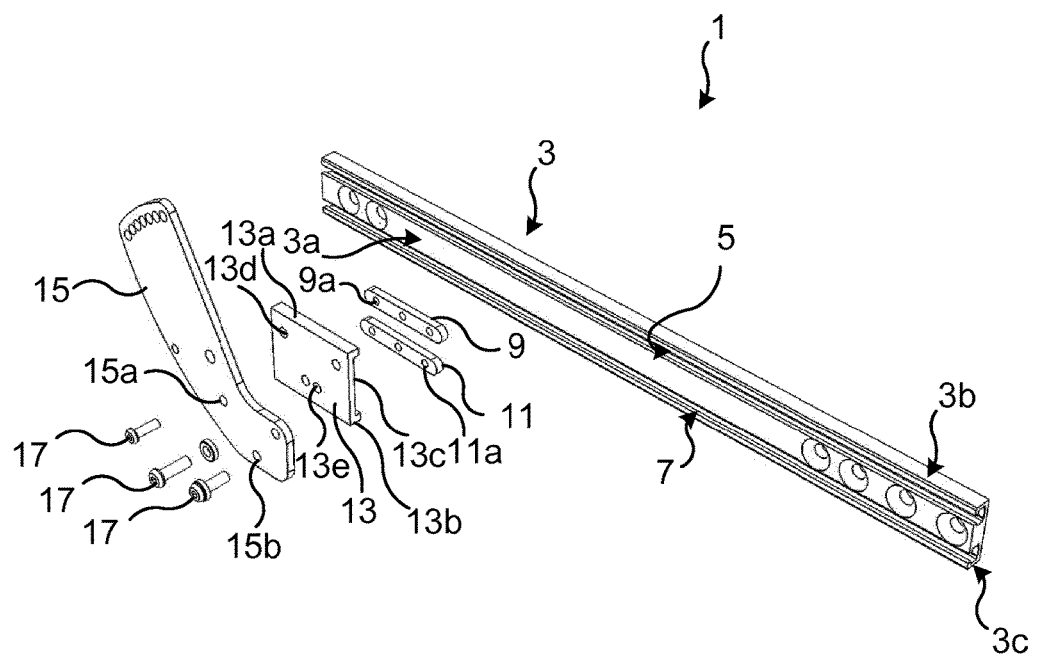
FIG. 1 is an exploded view of an example of a backrest fixation system.

FIG. 1 depicts an exploded view of an example of a backrest fixation system 1. The backrest fixation system 1 is arranged to be mounted to a wheelchair such as an electrically powered wheelchair, in order to be able to mount a backrest arrangement to the wheelchair by means of the backrest fixation system 1. To mount a backrest arrangement to a wheelchair, two sets of backrest fixation systems 1 are necessary, one for each of two frame members to which the backrest is assembled.

The backrest fixation system 1 comprises a seat frame member 3. The seat frame member may for example be a bar, as exemplified in FIG. 1, or an integrated portion of a seat frame. The seat frame member 3 depicted in FIG. 1 for example has a plurality of through-openings for mounting the seat frame member 3 to a wheelchair chassis by means of fasteners such as screws. When mounted to a chassis, the seat frame member 3 defines a lateral side of the wheelchair.

The seam frame member 3 has a groove side 3a comprising a first groove 5 and a second groove 7. The first groove 5 and the second groove 7 extend in parallel along the groove side 3a. According to the example, each of the first groove 5 and the second groove 7 open at one end or both ends of the seat frame member 3.

The seat frame member 3 further has a first lateral side 3b and a second lateral side 3c relative to the groove side 3a. The groove side 3a is hence arranged between the first lateral side 3b and the second lateral side 3c. The first lateral side 3b is parallel with or essentially parallel with the second lateral side 3c. According to the depicted example, the surface defined by the groove side 3a is orthogonal to the surfaces defined by the first lateral side 3b and the second lateral side 3c, although other configurations are also envisaged. The first lateral side and/or the second lateral side could for example be slightly inclined, in which case the surface defined by the groove side would not be orthogonal to the surfaces of the first lateral side and the second lateral side. Furthermore, the surfaces defined by the first lateral side and the second lateral side need not necessarily be parallel.

The backrest fixation system 1 comprises a first groove insert member 9 and a second groove insert member 11. Each of the first groove insert member 9 and the second groove insert member 11 are adapted to be arranged in any of the first groove 5 and the second groove 7. Each of the first groove insert member 9 and the second groove insert member 11 hence have width and height dimensions which are smaller or correspond to the corresponding dimensions of the first groove 5 and/or the second groove 7.

The first groove insert member 9 may be inserted into the first groove 5, for example, from an end of the groove side 3a, where the first groove 5 opens, and may be slid into a suitable position along the first groove 5. Similarly, the second groove insert member 11 may be inserted into the second groove 7, for example, from an end of the groove side 3a, and may be slid into a suitable position along the second groove 7.

The first groove insert member 9 has at least one first groove insert member through-opening 9a adapted to receive a fastener 17. The second groove insert member 11 has at least one second groove insert member through-opening 11a adapted to receive a fastener 17.

According to one variation, the first groove insert member 9 and the second groove insert member 11 are structurally identical. The manufacturing of the backrest fixation system 1 may thus be simplified, since essentially identical structural elements may be used for placement in the first groove 5 and the second groove 7.

The backrest fixation system 1 further comprises a reinforcement member 13, a backrest attachment member 15, and fasteners 17. The reinforcement member 13 is arranged to be attached to the first groove insert member 9 and to the second groove insert member 11. The fasteners 17 may for example be screws.

The reinforcement member 13 has a first leg 13a, a second leg 13b and a central portion 13c extending between the first leg 13a and the second leg 13b. To this end, the first leg 13a extends from a first end of the central portion 13c and the second leg 13b extends from a second end opposite the first end. The first leg 13a extends perpendicularly or essentially perpendicularly to a plane defined by the central portion 13c. The second leg 13b extends perpendicularly or essentially perpendicularly to the plane defined by the central portion 13c. In a typical variation, the first leg 13a and the second leg 13b are parallel.

According to the variation depicted in FIG. 1, the first leg 13a extends along the entire first end and the second leg 13b extends along the entire second end. The first leg 13a, the central portion 13c and the second leg 13b define a channel with the central portion defining the channel bottom and the first leg 13a and the second leg 13b defining side walls of the channel. The central portion 13c is dimensioned to extend along the entire groove side 3a of the seat frame member 3. In particular, the central portion 13c has a length dimension between the first leg 13a and the second leg 13b which essentially corresponds to the distance between the first lateral side 3b and the second lateral side 3c of the seat frame member 3.

The exemplified reinforcement member 13 has a plurality of reinforcement member through-openings 13d, 13e, namely a first reinforcement member through-opening 13d and a second reinforcement member through-opening 13e. The reinforcement member through-opening 13d, 13e extend through the central portion 13c. The first reinforcement member through-opening 13d is located closer to the first leg 13a than to the second leg 13b. The second reinforcement member through-opening 13e is located closer to the second leg 13b than to the first leg 13a.

The backrest attachment member 15 is arranged to be mounted to the seat frame member 3 via the reinforcement member 13, and is arranged to support a frame member of a backrest arrangement. The backrest attachment member 15 has a first backrest member through-opening 15a arranged to be aligned with the first reinforcement member through-opening 13d, and a second backrest member through-opening 15b arranged to be aligned with the second reinforcement member through-opening 13e. A fastener 17 may thus be arranged to extend through the first backrest attachment member through-opening 15a, the first reinforcement member through-opening 13d and the first insert member through-opening 9a. Another fastener 17 may be arranged to extend through the second backrest attachment member through-opening 15b, the second reinforcement member through-opening 13e and the second insert member through-opening 11a. The entire backrest fixation system 1 may thereby be assembled as shown in FIG. 2.

It should be noted that according to some variations of the backrest fixation system there may be more through-openings in the components described above. For, example, as shown in FIG. 1, the backrest attachment member may have two first backrest attachment member through-openings, the reinforcement member may have two corresponding first reinforcement member through-openings, and the first insert member may have two first insert member through-openings. The backrest attachment member may thus be attached to the first insert member by means of two fasteners.

Figure 2:
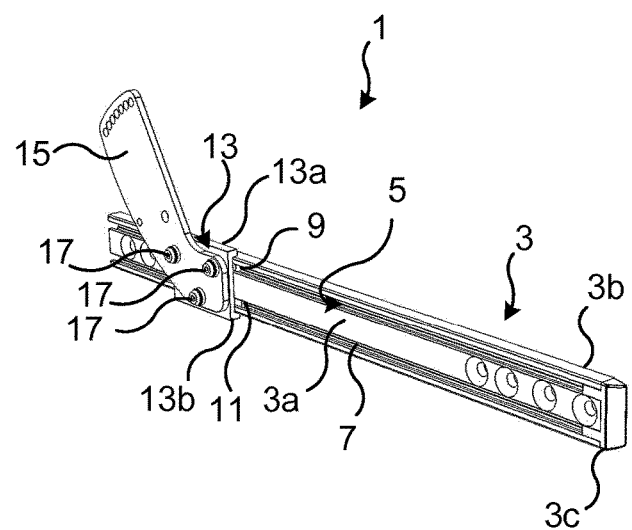
FIG. 2 is a perspective view of the backrest fixation system in FIG. 1.

In FIG. 2, the backrest fixation system 1 is depicted in an assembled state. The first insert member 9 is arranged in the first groove 5 of the seat frame member 3. The second groove insert member 11 is arranged in the second groove 7 of the seat frame member 3. The reinforcement member 13 is arranged between the groove side 3a of the seat frame member 3 and the backrest attachment member 15. The central portion 13c of the reinforcement member 13 faces and abuts the groove side 3a. The first leg 13a extends along the first lateral side 3b and the second leg extends along the second lateral side 3c. The first leg 13a and the second leg 13b hence embrace the seat frame member 3. A first fastener 17 extends through the first backrest attachment member through-opening 15a, the first reinforcement member through-opening 13d, and the first groove insert member through-opening 9a. Similarly, a second fastener 17 extends through the second backrest attachment member through-opening 15b, the second reinforcement member through-opening 13e, and the second groove insert member through-opening 11a. The backrest attachment member 15 may thereby be attached to the seat frame member 3 with high mechanical strength. In particular, the backrest fixation system 1 is able to withstand large deceleration forces in a satisfying manner.

The fasteners 17 are inserted in a direction towards the seat frame member 3, with the fastener tips arranged in the first groove insert member 9 and the second groove insert member 11. The fastener heads hence protrude from the backrest attachment member 15, as opposed to prior solutions were each screw head was arranged in the groove.

The mechanics that enable retention of the first groove insert member 9 in the first groove 5 and retention of the second groove insert member 11 in the second groove 7 will be explained in the following.

FIG. 3a depicts a cross-section of the reinforcement member 13 bearing against the groove side 3a of the seat frame member 3, the cross-section being taken at the second reinforcement member through-opening 13e.

The first leg 13a has an inner surface which faces the first lateral side 3b of the seat frame member 3. The second leg 13b has an inner surface which faces the second lateral side 3c of the seat frame member 3. The reinforcement member 13 is hence able to receive a portion of the seat frame member 3 by means of the first leg 13a and the second leg 13b. The inner surface of the first leg 13a which faces the first lateral side 3b is typically arranged at a small distance from the first lateral side 3b. Similarly, the inner surface of the second leg 13b which faces the second lateral side 3c is typically arranged at a small distance from the second lateral side 3c. This distance is typically a design parameter for obtaining a tolerance to be able to assemble the reinforcement member 13 with the seat frame member 3.

In FIG. 3a, the first groove insert member 9 is arranged in the first groove 5 and the second groove insert member 11 is arranged in the second groove 7. The seat frame member 3 is designed in such a manner that each of the first groove 5 and the second groove 7 has a narrower mouth than a corresponding dimension of the first groove insert member 9 and the second groove insert member 11. The mouth has a dimension d which is smaller than a corresponding dimension D of the first groove insert member 9 and the second groove insert member 11. In particular, the dimension d of the mouth is smaller than the largest dimension of the first insert member 9 in a direction from the first lateral side 3b towards the second lateral side 3c when the first groove insert member 9 is arranged in the first groove 5. The same applies to the second groove insert member 11. The first groove insert member 9 is hence retained in the first groove 5 by means of first groove retaining surfaces 5a and 5b located at both sides of the mouth of the first groove 5. The second groove insert member 11 is retained in the second groove 7 by means of second groove retaining surfaces 7a and 7b located at both sides of the mouth of the second groove 7.

The first leg 13a has an overlap 1 with the first lateral side 3b corresponding to at least 20% of the thickness L of the seat frame member 3, preferably an overlap of at least 30% of the thickness L. The second leg 13b has an overlap 1 with the second lateral side 13b corresponding to at least 20% of the thickness L of the seat frame member 3, preferably an overlap of at least 30% of the thickness L.

FIG. 3b depicts a cross-section of the backrest fixation system 1 shown in FIG. 2, the cross-section being taken at the first reinforcement member through-opening 13d. It can be seen that fasteners 17 extend through the through-openings of the backrest fixation system 1 components previously described.

The backrest fixation system is advantageously made of metal, such as steel, or a combination of different metals such as steel and aluminium. The reinforcement member may for example be manufactured of steel or aluminium.

Figure 4:
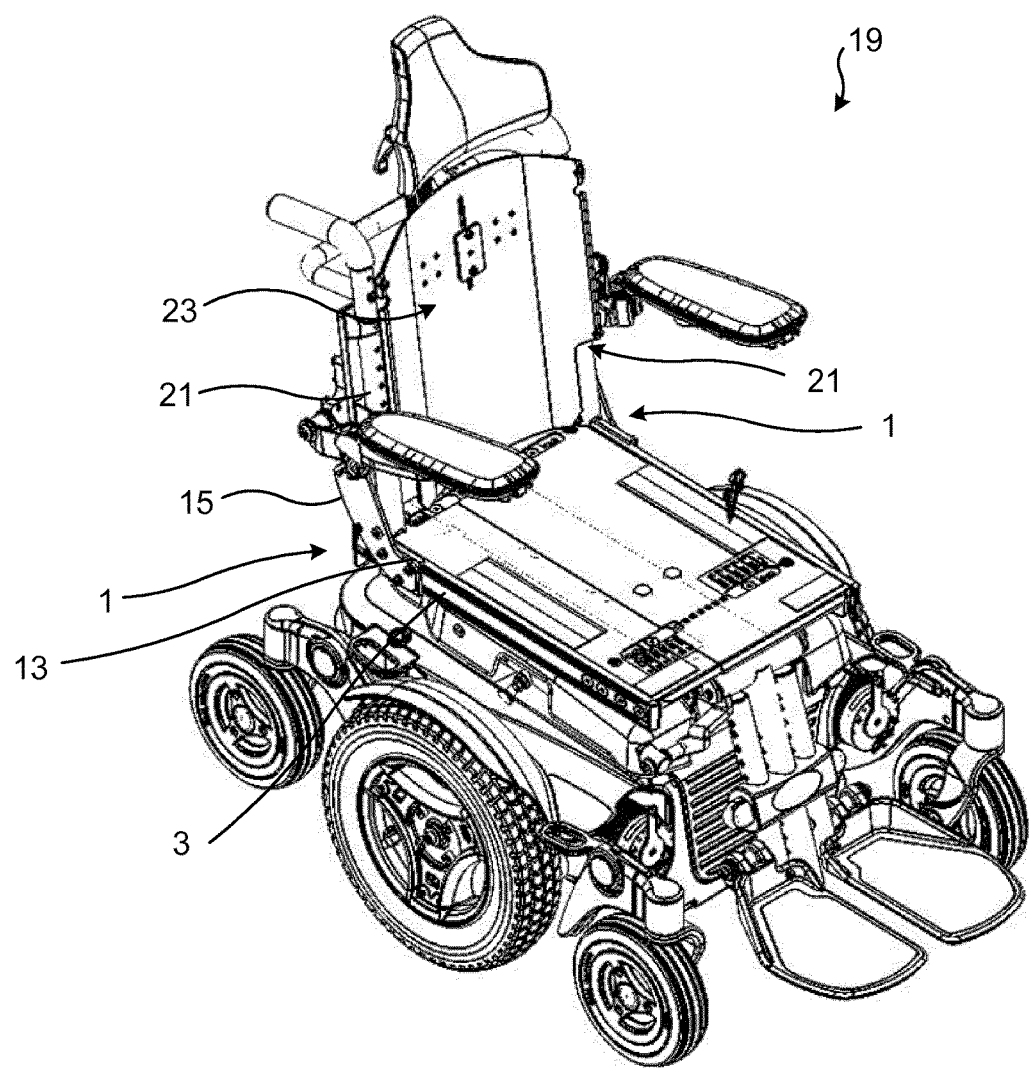
FIG. 4 is a perspective view of an example of an electrically powered wheelchair comprising a backrest fixation system.

FIG. 4 depicts an example of an electrically powered wheelchair 19 without the seat cushion and backrest cushion attached to show the backrest fixation system 1 more clearly. Although the exemplified wheelchair 1 is of midwheel drive type, it should be noted that the wheelchair alternatively could be of for example frontwheel drive type, back wheel drive type, four wheel drive type or six wheel drive type. The electrically powered wheelchair 19 is provided with two backrest fixation systems 1, each supporting a respective frame member 21 to which a backrest 23 is attached.

By means of the backrest fixation systems 1, backrest movement may be restricted when the electrically powered wheelchair 19 is subjected to high deceleration forces. In particular, the backrest attachment members 15 will normally stay attached to the seat frame members 3, and the seat frame members 3 will be unaffected in such situations.

The inventive concept has mainly been described above with reference to a few examples. However, as is readily appreciated by a person skilled in the art, other embodiments than the ones disclosed above are equally possible within the scope of the inventive concept, as defined by the appended claims. The seat frame member may for example comprise fewer or more grooves, and the backrest fixation system may comprise a corresponding number of groove insert members.

The invention claimed is:

1. A backrest fixation system for a wheelchair, wherein the backrest fixation system comprises:
   a seat frame member having a groove side provided with a first groove having first groove retaining surfaces, which seat frame member has a first lateral side and a second lateral side parallel to each other and which define lateral sides of the groove side,
   a first groove insert member arranged in the first groove and retained in the first groove by the first groove retaining surfaces,
   a backrest attachment member having a first backrest attachment member through-opening,
   a first fastener, and
   a reinforcement member arranged between the backrest attachment member and the groove side of the seat frame member, which reinforcement member has a first leg and a second leg, wherein the first leg extends along the first lateral side of the seat frame member and the second leg extends along the second lateral side of the seat frame member,
   wherein the first groove insert member is provided with a first groove insert member through-opening and the reinforcement member is provided with a first reinforcement member through-opening, and wherein the first fastener extends through the first backrest attachment member through-opening, the first reinforcement member through-opening, and the first groove insert member through-opening.

2. The backrest fixation system of claim 1, wherein the first groove has a groove mouth which is narrower than a corresponding dimension of the first groove insert member.

3. The backrest fixation system of claim 1, wherein the first leg has an overlap with the first lateral side corresponding to at least 20% of the thickness of the seat frame member.

4. The backrest fixation system of claim 1, wherein the second leg has an overlap with the second lateral side corresponding to at least 20% of the thickness of the seat frame member.

5. The backrest fixation system of claim 1, wherein each of the first leg and the second leg extend along a respective entire side of the reinforcement member.

6. The backrest fixation system of claim 1, wherein the groove side has a second groove parallel to the first groove, which second groove has second groove retaining surfaces, wherein the backrest fixation system further comprises:
   a second groove insert member arranged in the second groove and retained in the second groove by the second groove retaining surfaces, and
   a second fastener,
   wherein the second groove insert member is provided with a second groove insert member through-opening, the reinforcement member is provided with a second reinforcement member through-opening, and the backrest attachment member has a second backrest attachment member through-opening, and wherein the second fastener extends through the second backrest attachment member through-opening, the second reinforcement member through-opening, and the second groove insert member through-opening.

7. The backrest fixation system of claim 6, wherein the second groove opens at one end of the groove side.

8. The backrest fixation system of claim 6, wherein the second groove has a groove mouth which is narrower than a corresponding dimension of the second groove insert member.

9. The backrest fixation system of claim 6, wherein the first groove insert member and the second groove insert member are structurally identical.

10. The backrest fixation system of claim 1, wherein the backrest fixation system is made of metal.

11. The backrest fixation system of claim 1, wherein the reinforcement member embraces the seat frame member by the first leg and the second leg.

12. The backrest fixation system of claim 1, wherein the first groove opens at one end of the groove side.

13. The backrest fixation system of claim 1, wherein the reinforcement member has a central portion, wherein the first leg extends from one end of the central portion and the second leg extends from another end of the central portion.

14. An electrically powered wheelchair comprising: a backrest arrangement having two frame members, and two backrest fixation systems as claimed in claim 1, wherein each backrest fixation system fixates a respective frame member.

\* \* \* \* \*